Dec. 1, 1953  J. T. RYALS  2,661,035
VERTICALLY-ADJUSTABLE TREE-FELLING TRACTOR MOUNTED SAW
Filed June 5, 1952  3 Sheets-Sheet 1
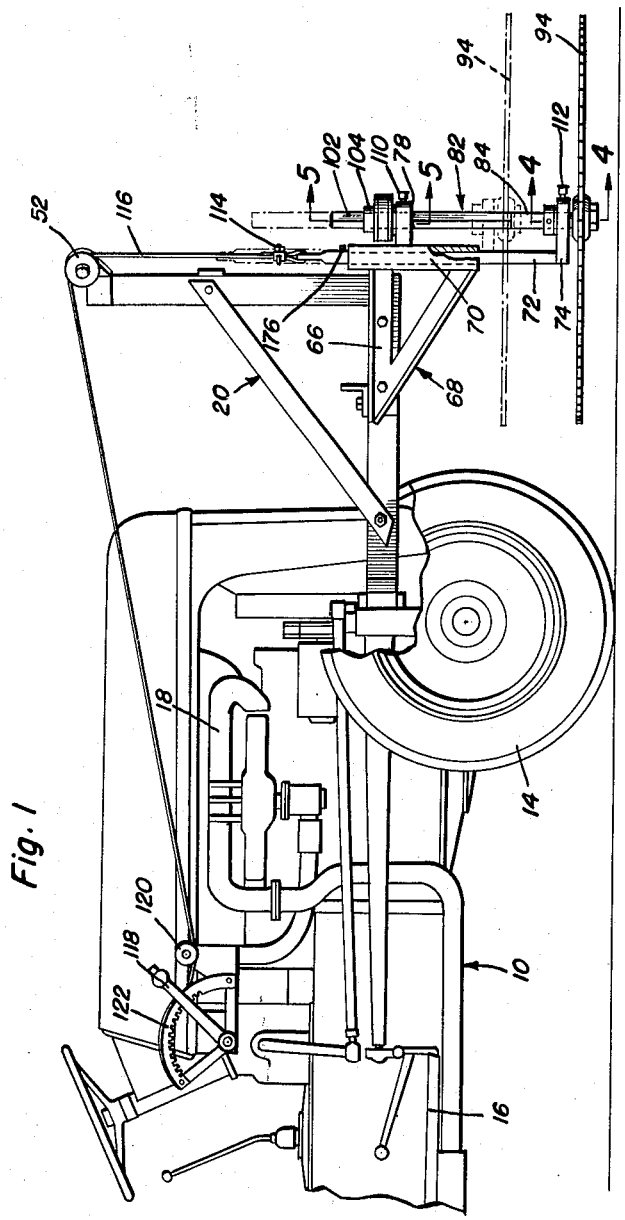
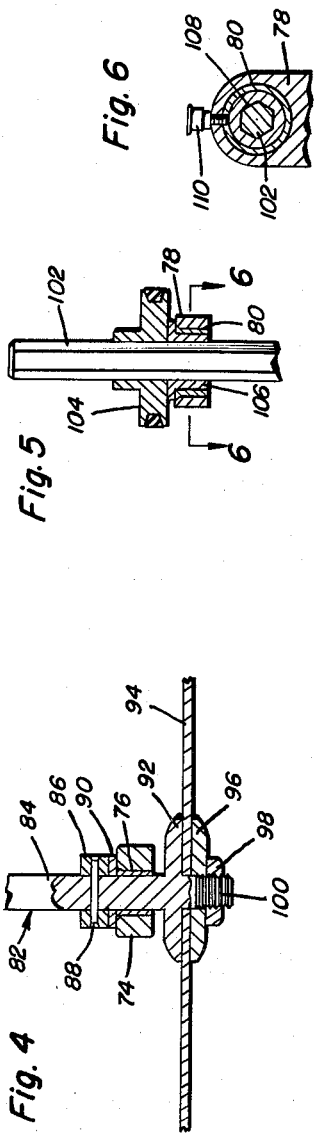
John T. Ryals
INVENTOR.
BY *Clarence A. O'Brien*
*and Harvey B. Jacobson*
Attorneys Dec. 1, 1953 J. T. RYALS 2,661,035
VERTICALLY-ADJUSTABLE TREE-FELLING TRACTOR MOUNTED SAW
Filed June 5, 1952 3 Sheets-Sheet 2

John T. Ryals
INVENTOR.

Dec. 1, 1953  J. T. RYALS  2,661,035
VERTICALLY-ADJUSTABLE TREE-FELLING TRACTOR MOUNTED SAW
Filed June 5, 1952  3 Sheets-Sheet 3
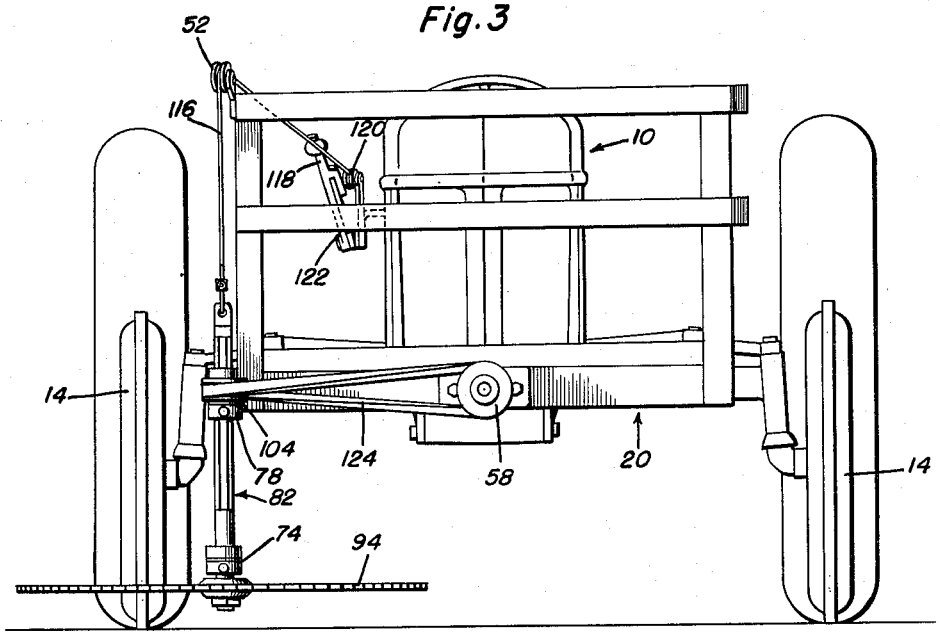
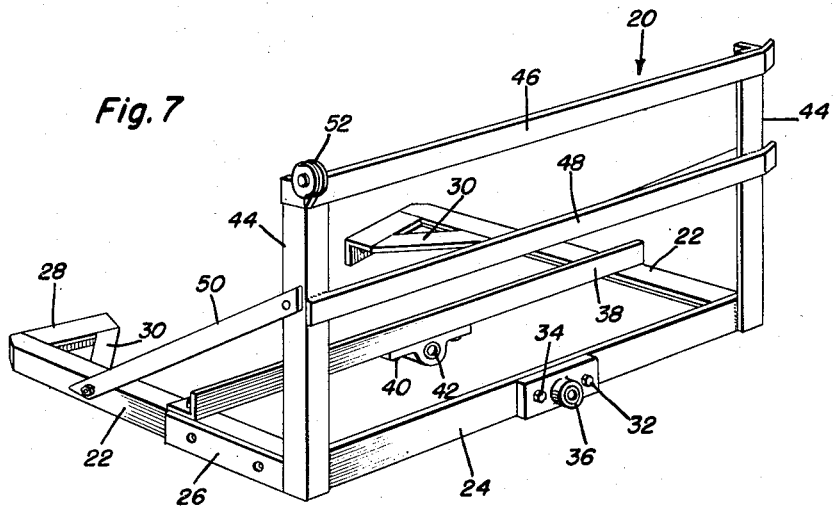
John T. Ryals
INVENTOR.

Patented Dec. 1, 1953

2,661,035

UNITED STATES PATENT OFFICE 2,661,035

VERTICALLY-ADJUSTABLE TREE-FELLING TRACTOR MOUNTED SAW

John T. Ryals, Unionville, Mo.

Application June 5, 1952, Serial No. 291,909

1 Claim. (Cl. 143—43)

This invention relates in general to a saw, and more specifically to a saw mounted on a tractor and driven by the same.

The primary object of this invention is to provide an improved tractor mounted saw which is mounted at the forward end of the tractor and driven by a drive shaft directly connected to the motor of the tractor.

Another object of this invention is to provide an improved support for a saw which may be conveniently mounted on the forward end of a tractor for attaching a saw thereto.

Another object of this invention is to provide an improved support for a saw, said support including a fixed support and a movable support whereby the saw blade may be vertically adjusted.

Another object of this invention is to provide an improved tractor mounted saw which includes support means formed of readily obtainable materials and being of a simplified construction whereby the same is economically feasible.

Another object of this invention is to provide an improved tractor mounted saw which is vertically adjustable and which may be remotely adjusted from a position adjacent a seat of a tractor on which the same is mounted.

With these objects definitely in view, this invention resides in certain novel features of construction, combination and arrangement of elements and portions as will be hereinafter described in detail in the specification, particularly pointed out in the appended claim, and illustrated in the accompanying drawings which form a material part of this application and in which:

Figure 1 is a fragmentary side elevational view of the forward portion of a conventional tractor which has mounted thereon the saw attachment, which is the subject of this invention, adjusted positions of the saw and its support means being shown by dotted lines;

Figure 3 is a front elevational view of the tractor of Figure 1 and shows the general position of the saw attachment with respect to the front end of the tractor;

Figure 4 (Sheet 1) is an enlarged fragmentary transverse vertical sectional view taken substantially upon the plane indicated by the section line 4—4 of Figure 1 and shows the manner in which a saw blade is supported at a lower end of its associated shaft;

Figure 5 is an enlarged fragmentary transverse vertical sectional view taken substantially upon the plane indicated by the section line 5—5 of Figure 1 and shows the general construction of an upper support for the shaft of the saw blade;

Figure 2:
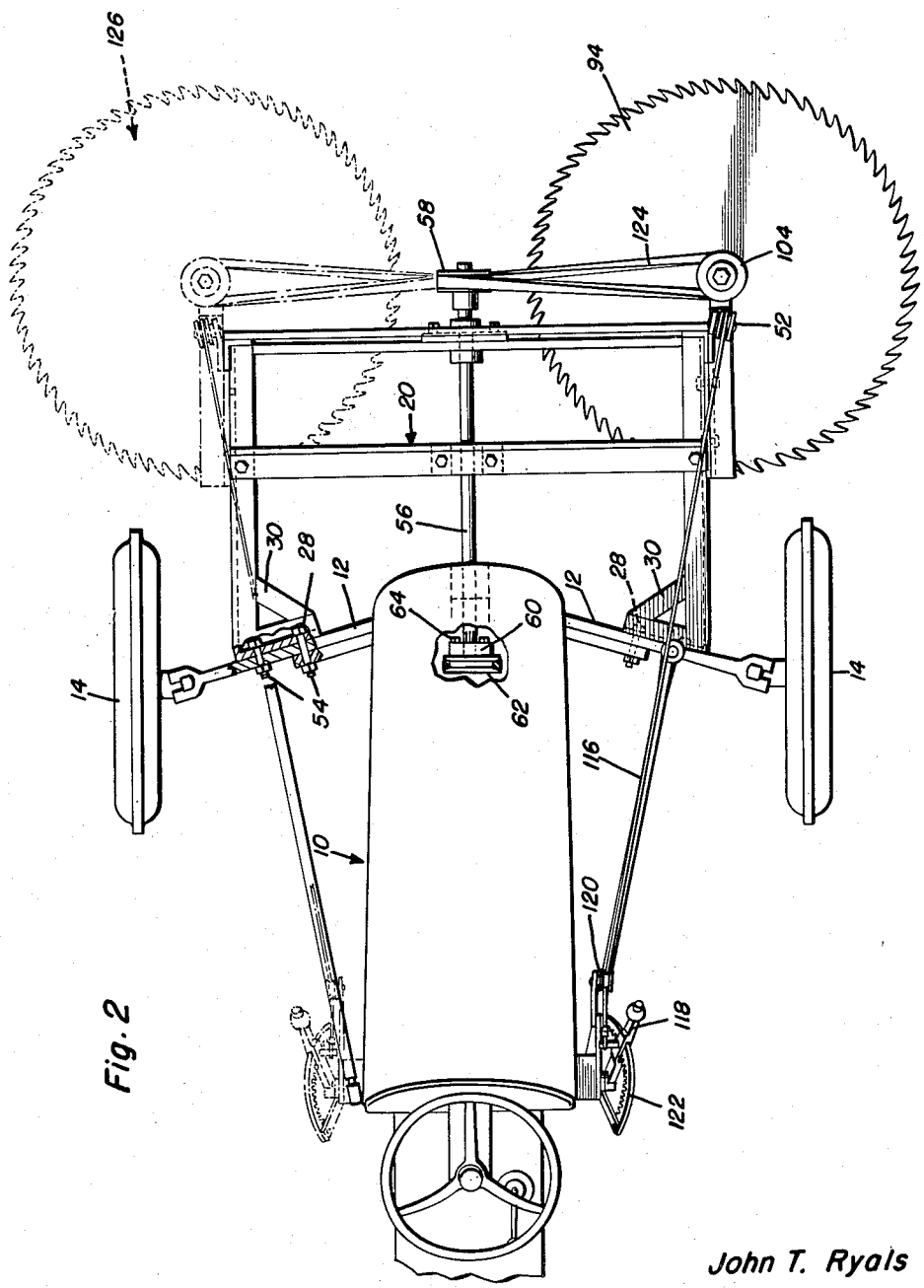
Figure 2 is a top plan view of the tractor mounted saw of Figure 1 and shows the general arrangement of drive means therefor, a portion of the hood of the tractor being broken away in order to clearly illustrate the manner in which a drive shaft is connected to a crank shaft of the tractor's motor, a position of a second saw being shown by dotted lines.

Figure 6 is a fragmentary transverse horizontal sectional view taken substantially on the plane indicated by the section line 6—6 of Figure 5 and shows the general shape of the bearing portion of the upper support; and Figure 7 (Sheet 3) is a perspective view of a supporting frame which forms a major portion of the saw attachment and is adapted to be secured to the front axle of the tractor of Figure 1.

Similar characters of reference designate similar or identical elements and portions throughout the specification and throughout the different views of the drawings.

Referring now to the drawings in detail, it will be seen that there is illustrated a conventional farm tractor, which is referred to in general by the reference numeral 10. The farm tractor 10 includes a front axle 12 on which are mounted front wheels 14 for supporting the forward end of the tractor 10. The tractor 10 also includes generally a frame 16 which has mounted in the forward end thereof a motor 18.

Referring now to Figure 7 in particular, it will be seen that there is illustrated a major portion of the tractor attachment, which is the subject of this invention, the tractor attachment including a supporting frame, which is referred to in general by the reference numeral 20. The supporting frame 20 includes a generally U-shaped base formed of angle members and including a pair of rearwardly extending leg portions 22 connected together at their forward end by a transverse lower front frame member 24. The forward ends of a vertical flange of the legs 22 are reinforced by plates 26 secured to the outer surfaces thereof. The rear ends of the legs 22 are provided with inwardly and forwardly extending connecting members 28, the connecting members 28 being braced with respect to the associated legs 22 by diagonal braces 30. The lower front transverse frame member 24 includes a plate 32 which is secured thereto by a plurality of fasteners 34 and having a front journal 36 mounted therein. Extending between and secured to the legs 22 is a second transverse frame member 38 which is positioned intermediate the ends of the legs 22 and has secured to the underside thereof a pillow block 40, the pillow block 40 including a journal portion 42 which is in longitudinal alignment with the journal 36.

The supporting frame 20 also includes a pair of standards 44 which are secured to the forward ends of the legs 22 and extend upwardly therefrom. The upper ends of the standards 44 are connected together by an upper front transverse frame member 46 which extends between the same and is connected thereto. Also extending between the standards 44, but intermediate the ends thereof, is an intermediate front transverse frame member 48. The standards 44 are braced with respect to the legs 22 by a rearwardly extending diagonal brace 50 which is secured to and extends between an associated standard 44 and leg 22. Mounted at the outer left hand end of the upper transverse frame member 46, as viewed from the front of the supporting frame 20, is a pulley 52 whose purpose will be explained in more detail hereinafter.

Referring now to Figure 2 in particular, it will be seen that the supporting frame 20 is secured to the front axle 12 of the tractor 10 by a plurality of fasteners 54 which connect the support members 28 to the front axle. The journals 36 and 42 are in alignment with the longitudinal center line of the tractor 10 and have mounted therein for rotation a drive shaft 56. The forward end of the drive shaft 56 is provided with a conventional drive pulley 58 and the rear end thereof has adjustably splined thereon a connecting hub 60. It is intended that the rear portion of the drive shaft 56 extend rearwardly through the front of the tractor 10 and the hub 60 be connected to a drive pulley 62 mounted on the crank shaft (not shown) of the tractor motor 18 by a plurality of fasteners 64.

Referring now to Figure 1 in particular, it will be seen that secured to one of the legs 22 of the supporting frame 20 and overlying the reinforcing plate 26 is an upper horizontal leg 66 of a triangular support bracket, which is referred to in general by the reference numeral 68. The triangular support bracket also includes a vertical member 70. The vertical member 70 is a tubular member having a bore therethrough, the tubular member having mounted within its bore an elongated shaft 72. The shaft 72 has secured to the lower end thereof a forwardly extending plate 74 in which is mounted a bearing 76 (Fig. 4). Rigidly secured to the tubular member 70 intermediate the ends thereof and extending forwardly therefrom in overlying relation to the plate 74 is a plate 78 in which is mounted a bearing 80 (Figs. 5 and 6).

The bearings 76 and 80 are in vertical alignment and having extending therethrough a saw blade shaft, which is referred to in general by the reference numeral 82. The saw blade shaft 82 includes a circular lower portion 84 which extends through the bearing 76 and is supported thereby. The saw blade shaft 82 is positioned with respect to the bearing 76 and its associated plate 74 by a collar 86 secured thereto by a transverse pin 88. The collar 86 engages a washer 90 carried by the circular lower portion 84 and resting upon the plate 74. The lower end of the circular lower portion 84 is provided with a shoulder 92 against which abuts the upper surface of a saw blade 94. The saw blade 94 is retained in position on the saw blade shaft 82 by a second flange 96, which is removable from the end 84, the second flange 96 being clamped against the underside of the saw blade 96 by a nut 98 threadedly engaged on the threaded extreme lower end 100 of the saw blade shaft 82.

Referring now to Figure 5 in particular, it will be seen that the saw blade shaft 82 also includes an upper portion 102 which is generally hexagonal in cross section. Slidably carried by the upper portion 102 of the saw blade shaft 82 is a driven pulley 104 which is adapted to rotate the saw blade shaft 82. Underlying the driven pulley 104 and carried by the upper portion 102 is a bushing 106. The bushing 106 is generally circular in cross section and has an hexagonal bore 108 therethrough through which is passed the upper portion 102 of the saw blade shaft 82. It will be noted that the bushing 106 is rotatably supported by the bearing 80 and that the bearing 80 is lubricated by a grease fitting 110 (Figs. 1 and 6) secured to the forward end of the plate 78. The bearing 76 is lubricated by a similar grease fitting 112 carried by the forward end of the plate 74.

Referring now to Figure 1 in particular, it will be seen that the upper end of the shaft 72 has connected thereto a looped lower end 114 of a cable 116. The cable 116 is entrained over the pulley 52 and extends rearwardly therefrom. The rear end of the cable 116 is connected to an actuating lever 118 and passes under a pulley 120 immediately forward of said lever 118. The lever 118 is pivotally connected to a sector rack 122 carried by the frame 16 of the tractor 10 adjacent the driver's seat (not shown) thereof. It will be seen that pulling back on the lever 118 moves the cable 116 rearwardly with the result that the forward end thereof is moved vertically. The vertical movement of the cable 116 results in the vertical movement of the shaft 72. When the shaft 72 is raised, the saw blade 94 and its associated supporting structure including the lower bearing 76 is also raised, an elevated position of the saw blade being illustrated by dotted lines.

Referring now to Figure 2 in particular, it will be seen that entrained over the drive pulley 58 and the driven pulley 104 is a drive belt 124. Inasmuch as the saw blade shaft 82 is connected to the driven pulley 104 by a splined connection, it will be seen that the driven pulley 104 has a fixed vertical position and remains in alignment with the drive pulley 58. Therefore, the saw blade 94 may be vertically adjusted by utilizing the lever 118 while the same is in operation.

Referring now to Figure 1 in particular, it will be seen that the shaft 72 is provided adjacent its upper end with a stop pin 126 which limits the downward movement thereof whereby the saw blade 94 is prevented from digging into the ground.

Referring now to Figure 2 in particular, it will be seen that there is illustrated in dotted lines a second saw blade mechanism, which is referred to in general by the reference numeral 126. The saw blade mechanism 126 is identical to the saw blade mechanism mounted at the right side of the supporting frame 20, as is viewed in Figure 2, and may be either utilized in combination with the saw blade mechanism illustrated in solid lines so as to have two saw blade mechanisms operating at a single time, or it may be considered to be an alternate structure in order that the operator of the tractor 10 may selectively position the mechanism on the side of the supporting frame he desires. In any case, the operation of the saw blade mechanism 126 will be identical to that illustrated and described herein.

The operation of this device will be understood from the foregoing description of the details thereof, taken in connection with the above recited objects and the drawings. Further description would appear to be unnecessary.

Minor modifications of the device, varying in minor details from the embodiment of the device illustrated and described here, may be resorted to without departure from the spirit and scope of this invention, as defined in the appended claim.

Having described the invention, what is claimed as new is:

In combination with a tractor having a motor, a driver's seat and a front power take-off, a saw attachment, said saw attachment comprising a supporting frame removably secured to the front of said tractor, aligned horizontal bearings carried by said supporting frame, a drive shaft extending longitudinally of said tractor and journalled in said bearings, a rear end of said drive shaft being coupled to the front power take-off of said motor, a saw blade support selectively positioned at either side of said supporting frame, said saw blade support including a vertically extending tubular member having slidably disposed therein for vertical adjustment, a supporting shaft, a first saw blade shaft receiving support carried by a lower end of said supporting shaft for vertical adjustment therewith, a second saw blade shaft receiving support fixedly carried by said tubular member in vertical alignment with said first saw blade receiving support, a driven pulley rotatably carried by said second saw blade shaft receiving support, drive means connecting said drive pulley and said driven pulley, a saw blade shaft rotatably carried by said first and second saw blade shaft receiving supports, said saw blade shaft being restrained in said first saw blade receiving support for vertical movement therewith, said saw blade shaft being slidable through said second saw blade shaft receiving support and said driven pulley and drivingly connected to said driven pulley for rotation therewith, a flexible connecting member having one end connected to an upper end of said supporting shaft and extending vertically therefrom, the opposite end of said flexible member being connected to adjusting means carried by said tractor adjacent said driver's seat.

JOHN T. RYALS.

References Cited in the file of this patent

UNITED STATES PATENTS

| Number | Name | Date |
|---|---|---|
| 638,553 | Burke | Dec. 5, 1899 |
| 1,067,076 | Tapp | July 8, 1913 |
| 2,233,114 | Sowell | Feb. 25, 1941 |
| 2,441,431 | McDonald | May 11, 1948 |
| 2,457,511 | Ware | Dec. 28, 1948 |
| 2,463,232 | Zimicki | Mar. 1, 1949 |
| 2,577,906 | Miller et al. | Dec. 11, 1951 |

FOREIGN PATENTS

| Number | Country | Date |
|---|---|---|
| 211,980 | Germany | July 17, 1908 |